(12) United States Patent
Yoon et al.

(10) Patent No.: US 12,359,361 B2
(45) Date of Patent: Jul. 15, 2025

(54) SYSTEMS AND METHODS USING IMAGE RECOGNITION PROCESSES FOR IMPROVED OPERATION OF A LAUNDRY APPLIANCE

(71) Applicant: Haier US Appliance Solutions, Inc., Wilmington, DE (US)

(72) Inventors: Je Kwon Yoon, Seongnam (KR); Hyeonsoo Moon, Seoul (KR); Khalid Jamal Mashal, Louisville, KY (US); Suzy Kwak, Seoul (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 314 days.

(21) Appl. No.: 17/858,617

(22) Filed: Jul. 6, 2022

(65) Prior Publication Data
US 2024/0011213 A1    Jan. 11, 2024

(51) Int. Cl.
| | |
|---|---|
| D06F 34/18 | (2020.01) |
| D06F 34/04 | (2020.01) |
| G06T 11/00 | (2006.01) |
| G06V 10/75 | (2022.01) |
| H04N 7/18 | (2006.01) |
| D06F 103/04 | (2020.01) |
| D06F 103/06 | (2020.01) |
| D06F 103/40 | (2020.01) |

(52) U.S. Cl.
CPC .............. *D06F 34/18* (2020.02); *D06F 34/04* (2020.02); *G06T 11/00* (2013.01); *G06V 10/751* (2022.01); *H04N 7/183* (2013.01); *D06F 2103/04* (2020.02); *D06F 2103/06* (2020.02); *D06F 2103/40* (2020.02); *G06T 2207/20081* (2013.01); *G06T 2207/20084* (2013.01)

(58) Field of Classification Search
CPC .......... D06F 23/02; D06F 34/14; D06F 34/28; D06F 37/266; D06F 2103/04; D06F 2103/24; D06F 2105/54; D06F 2105/58
See application file for complete search history.

(56) References Cited

U.S. PATENT DOCUMENTS

| | | | |
|---|---|---|---|
| 9,014,826 B2 | 4/2015 | Yum et al. | |
| 9,222,212 B2* | 12/2015 | Johansson | D06F 58/52 |

(Continued)

FOREIGN PATENT DOCUMENTS

| | | |
|---|---|---|
| EP | 3751454 A1 | 12/2020 |
| KR | 101832762 B1 | 2/2018 |

*Primary Examiner* — Joseph L. Perrin
(74) *Attorney, Agent, or Firm* — Dority & Manning, P.A.

(57) ABSTRACT

A method may include obtaining one or more images of the washing machine appliance from a camera assembly of a remote device and detecting a fiducial reference on a front portion of the washing machine appliance within the one or more images. The method may also include comparing the detected fiducial reference to a two-dimensional reference shape in an obtained image of the images and determining a set camera angle for the camera assembly is met based on the comparison in the obtained image. The method may further include analyzing the obtained image using a machine learning image recognition process and estimating a load attribute of a load of clothes within the washing machine appliance based on the analysis. The method may still further include directing a wash cycle within the washing machine appliance based on the estimated load attribute.

17 Claims, 5 Drawing Sheets

(56) References Cited

U.S. PATENT DOCUMENTS

| | | |
|---|---|---|
| 9,798,946 B2 | 10/2017 | Lee et al. |
| 10,104,282 B2 | 10/2018 | Graham et al. |
| 10,612,175 B2 | 4/2020 | Hombroek |
| 11,124,916 B2 | 9/2021 | Ashrafzadeh et al. |
| 11,639,573 B2 * | 5/2023 | Ashrafzadeh ........... D06F 58/30 68/12.02 |
| 2005/0196046 A1 * | 9/2005 | Hudnut ............... A47L 15/4293 382/218 |
| 2019/0276973 A1 | 9/2019 | Homebroek |
| 2019/0284743 A1 | 9/2019 | Hwang et al. |
| 2019/0369031 A1 * | 12/2019 | Niikura ............. G02B 27/0006 |
| 2019/0382941 A1 * | 12/2019 | Hwang .................. D06F 33/36 |
| 2021/0230783 A1 * | 7/2021 | Mashal .................. D06F 34/08 |
| 2022/0136162 A1 * | 5/2022 | Lee ......................... D06F 34/22 8/158 |
| 2022/0154381 A1 * | 5/2022 | Mashal .................. D06F 34/18 |
| 2022/0178064 A1 * | 6/2022 | Dillon .................... D06F 33/32 |

\* cited by examiner

SYSTEMS AND METHODS USING IMAGE RECOGNITION PROCESSES FOR IMPROVED OPERATION OF A LAUNDRY APPLIANCE

FIELD OF THE INVENTION

The present subject matter relates generally to washing machine appliances, or more specifically, to systems and methods for using image recognition processes to improve or optimize operation of washing machine.

BACKGROUND OF THE INVENTION

Washing machine appliances generally include a tub for containing water or wash fluid, e.g., water and detergent, bleach, or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle, a drain pump assembly may operate to discharge water from within sump.

Notably, it is frequently desirable to understand characteristics of a load of clothes within the washing machine appliance, e.g., in order to optimize water usage, agitation time, agitation profile selection, and other wash parameters. For example, certain loads (e.g., towels or linens) may require more water and detergent, increased water temperature, and stronger agitation cycles. By contrast, other loads (e.g., such mixed color loads or delicates) may require cooler water and a gentler agitation profile. However, conventional washing machine appliances require a user to select operating cycles or specify the type of load added to the wash chamber, often resulting in inaccurate inputs or sub-optimal cycle settings. Attempts have been made to automatically (e.g., without direct user input or estimations) detect certain attributes of a load using sensors or detection assemblies within the washing machine appliance. Unfortunately, though, such systems may increase the expense and complexity of an appliance. Moreover, it can be difficult for a user to know if or when any detected attributes have been detected accurately or correctly.

Accordingly, a washing machine appliance with features for improved wash performance would be desirable. More specifically, a system and method for automatically detecting characteristics of the load of clothes and determining preferred operating parameters would be particularly beneficial, especially if such systems or methods could be achieved without requiring additional or dedicated sensing assemblies to be installed on the washing machine appliance. Additionally or alternatively, it may be beneficial to provide a system or method wherein a user could be confident that characteristics were detected in the correct manner (e.g., to ensure accuracy of such detections).

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a washing machine appliance is provided. The method may include obtaining one or more images of the washing machine appliance from a camera assembly of a remote device spaced apart from the cabinet and detecting a fiducial reference on a front portion of the washing machine appliance within the one or more images. The method may also include comparing the detected fiducial reference to a two-dimensional reference shape in an obtained image of the one or more images and determining a set camera angle for the camera assembly is met based on the comparison in the obtained image. The method may further include analyzing the obtained image using a machine learning image recognition process and estimating a load attribute of a load of clothes within the washing machine appliance based on the analysis. The method may still further include directing a wash cycle within the washing machine appliance based on the estimated load attribute.

In another exemplary aspect of the present disclosure, a method of operating a washing machine appliance is provided. The method may include obtaining one or more images of the washing machine appliance from a camera assembly of a remote device spaced apart from the cabinet. Obtaining one or more images may include receiving a video signal from the camera assembly. The method may also include presenting a real-time feed of the camera assembly at the remote device according to the received video signal, detecting a fiducial reference on a front portion of the washing machine appliance within the one or more images, and comparing the detected fiducial reference to a two-dimensional reference shape in an obtained image of the one or more images. The method may further include overlaying the two-dimensional reference shape over the real-time feed and determining a set camera angle for the camera assembly is met based on the comparison in the obtained image. The method may still further include analyzing the obtained image using a machine learning image recognition process and estimating a load attribute of a load of clothes within the washing machine appliance based on the analysis. The load attribute may include at least one of a fabric type, a load color, or a load size. The method may yet further include directing a wash cycle within the washing machine appliance based on the estimated load attribute.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
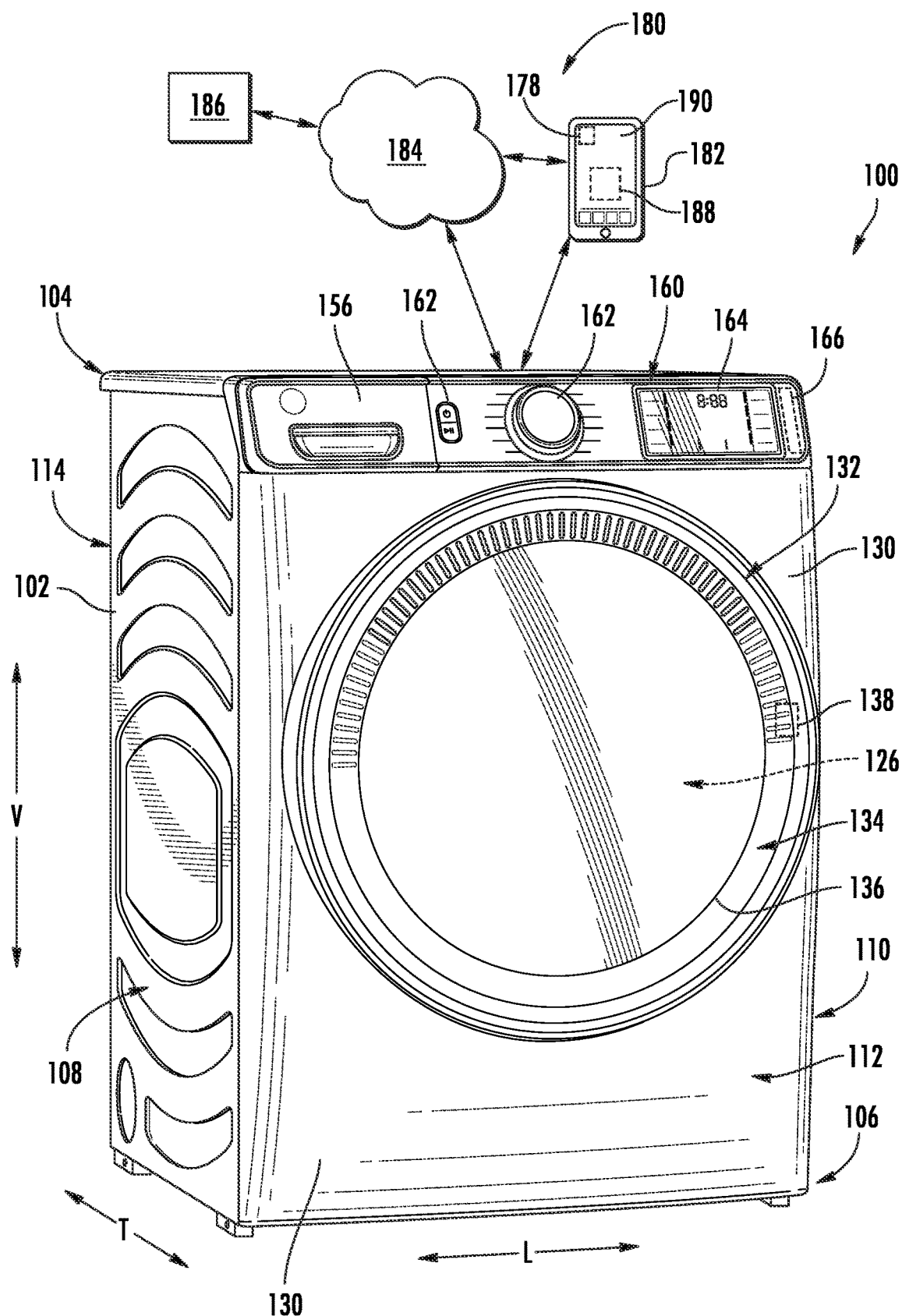
FIG. 1 provides a perspective view of an exemplary washing machine appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
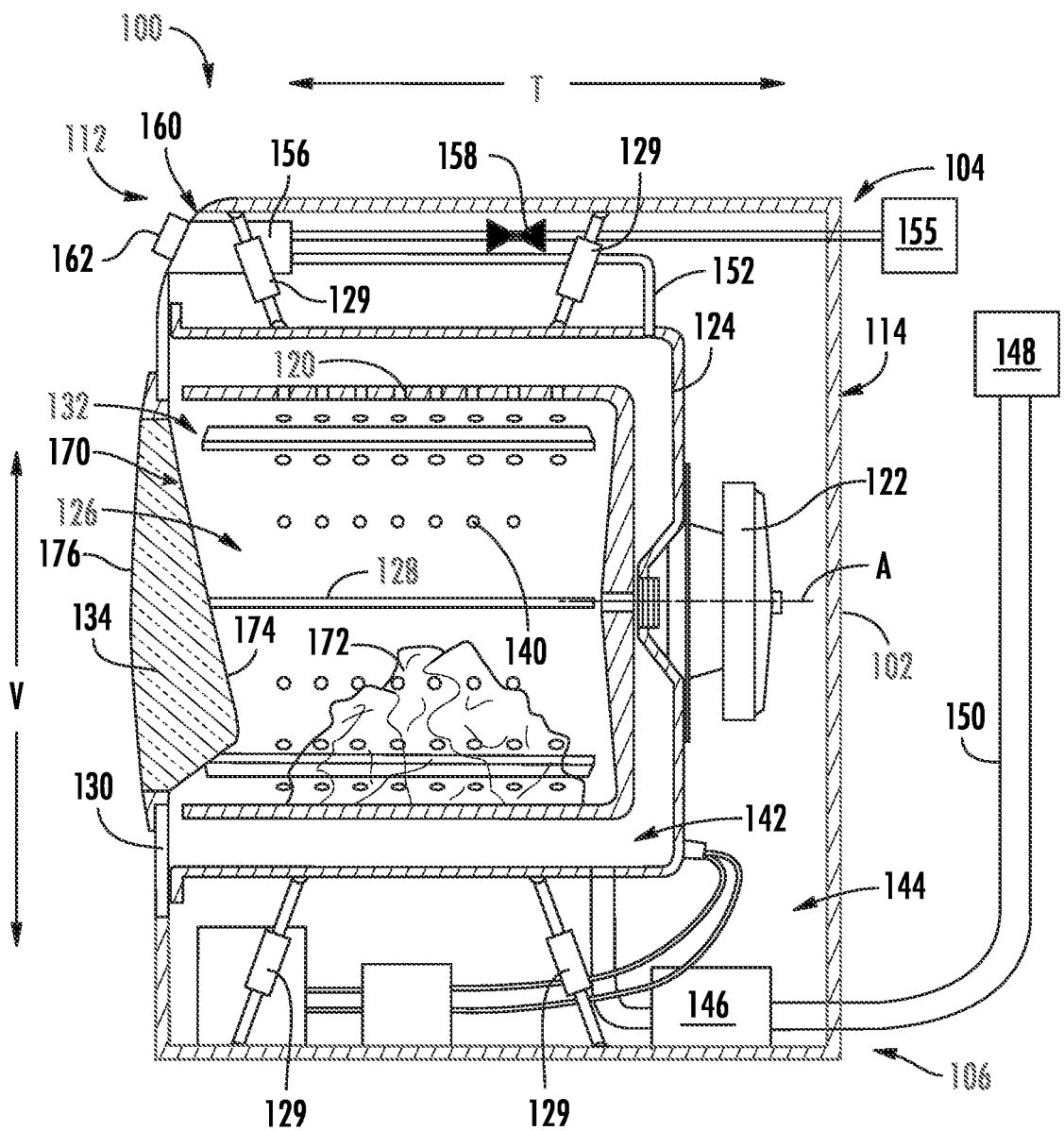
FIG. 2 provides a side cross-sectional view of the exemplary washing machine appliance of FIG. 1.
Figure 3A:
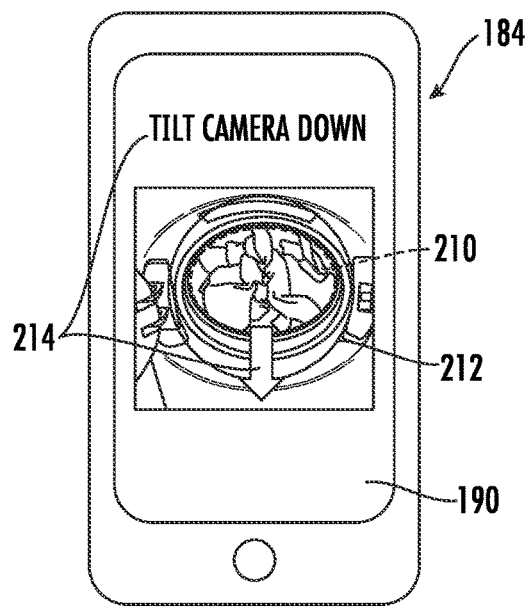
FIGS. 3A, 3B, 3C, and 3D provide illustrated plan views of a remote device displaying exemplary two dimensional images capturing a front portion of a washing machine appliance having an open door according to exemplary embodiments of the present disclosure.
Figure 3B:
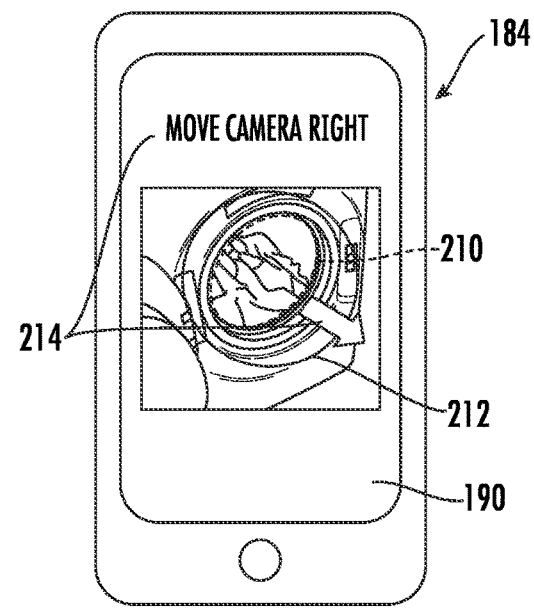
Figure 3C:
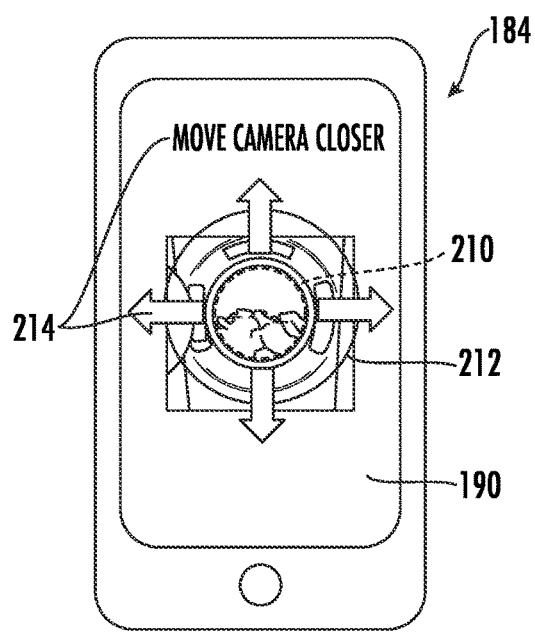
Figure 3D:
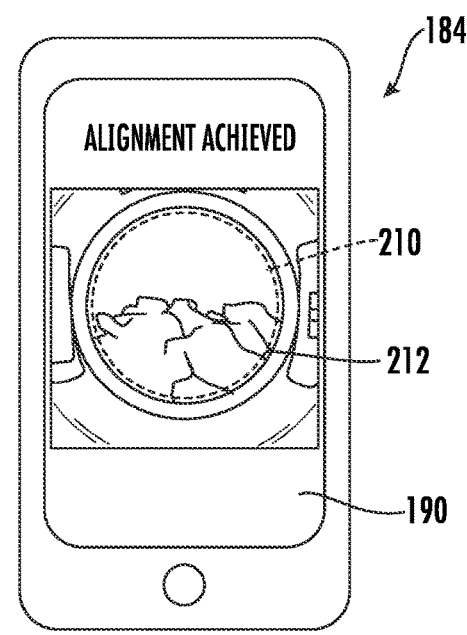

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined.

According to exemplary embodiments, washing machine appliance 100 includes a cabinet 102 that is generally configured for containing or supporting various components of washing machine appliance 100 and which may also define one or more internal chambers or compartments of washing machine appliance 100. In this regard, as used herein, the terms "cabinet," "housing," and the like are generally intended to refer to an outer frame or support structure for washing machine appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of washing machine appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing washing machine appliance 100.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

According to exemplary embodiments, wash tub 124 may be generally suspended within cabinet 102 by one or more suspension assemblies 129, e.g., as shown for example in FIG. 2. In this regard, wash tub 124, wash basket 120, motor 122, and other components of washing machine appliance 100 may be referred to generally herein as the subwasher. In order to reduce the transmission of vibrations and other forces from the subwasher to the cabinet 102 during operation of washing machine appliance 100, wash tub 124 may be generally isolated from cabinet 102 by suspension assemblies 129. This may be desirable to prevent undesirable noise, vibrations, "walking" of the appliance, etc. It should be appreciated that suspension assemblies 129 may generally include any suitable number and combination of springs, dampers, or other energy absorbing mechanisms to reduce the transmission of forces between the subwasher and cabinet 102. Although exemplary suspensions assemblies 129 are illustrated herein, it should be appreciated that the number, type, and configuration of suspension assemblies 129 may vary while remaining within the scope of the present subject matter.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments. Washing machine appliance 100 may further include a latch assembly 138 (see FIG. 1) that is mounted to cabinet 102 or door 134 for selectively locking door 134 in the closed position or confirming that the door is in the closed position. Latch assembly 138 may be desirable, for example, to ensure only secured access to wash chamber 126 or to otherwise ensure and verify that door 134 is closed during certain operating cycles or events.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for the receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

Washing machine appliance 100 may further include a wash fluid dispenser that is generally configured for dispensing a flow of water, wash fluid, etc. into wash tub 124. For example, a spout 152 is configured for directing a flow of fluid into wash tub 124. For example, spout 152 may be in fluid communication with a water supply 155 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 155) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

During operation of washing machine appliance 100, laundry items are loaded into wash basket 120 through opening 132, and washing operation is initiated through operator manipulation of one or more input selectors or using a remote device (see below). Wash tub 124 is filled with water, detergent, or other fluid additives, e.g., via spout 152 or detergent drawer 156. One or more valves (e.g., water supply valve 158) can be controlled by washing machine appliance 100 to provide for filling wash basket 120 to the appropriate level for the amount of articles being washed or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, or rinsed, the user can remove the articles from wash basket 120, e.g., by opening door 134 and reaching into wash basket 120 through opening 132.

Referring again to FIG. 1, washing machine appliance 100 may include a control panel 160 that may represent a general-purpose Input/Output ("GPIO") device or functional block for washing machine appliance 100. In some embodiments, control panel 160 may include or be in operative communication with one or more user input devices 162, such as one or more of a variety of digital, analog, electrical, mechanical, or electro-mechanical input devices including rotary dials, control knobs, push buttons, toggle switches, selector switches, and touch pads. Additionally, washing machine appliance 100 may include a display 164, such as a digital or analog display device generally configured to provide visual feedback regarding the operation of washing machine appliance 100. For example, display 164 may be provided on control panel 160 and may include one or more status lights, screens, or visible indicators. According to exemplary embodiments, user input devices 162 and display 164 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Washing machine appliance 100 may further include or be in operative communication with a processing device or a controller 166 that may be generally configured to facilitate appliance operation. In this regard, control panel 160, user input devices 162, and display 164 may be in communication with controller 166 such that controller 166 may receive control inputs from user input devices 162, may display information using display 164, and may otherwise regulate operation of washing machine appliance 100. For example, signals generated by controller 166 may operate washing machine appliance 100, including any or all system components, subsystems, or interconnected devices, in response to the position of user input devices 162 and other control commands. Control panel 160 and other components of washing machine appliance 100 may be in communication with controller 166 via, for example, one or more signal lines or shared communication busses. In this manner, Input/Output ("I/O") signals may be routed between controller 166 and various operational components of washing machine appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog or digital logic circuitry (such as switches, amplifiers, integrators, comparators, flip-flops, OR gates, and the like) to perform control functionality instead of relying upon software.

Controller 166 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information or data accessible by the one or more processors, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 166 may be operable to execute programming instructions or micro-control code associated with an operating cycle of washing machine appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 166 as disclosed herein is capable of and may be operable to perform any methods, method steps, or portions of methods of appliance operation. For example, in some embodiments, these methods may be embodied in programming instructions stored in the memory and executed by controller 166.

The memory devices may also store data that can be retrieved, manipulated, created, or stored by the one or more processors or portions of controller 166. The data can include, for instance, data to facilitate performance of methods described herein. The data can be stored locally (e.g., on controller 166) in one or more databases or may be split up so that the data is stored in multiple locations. In addition, or alternatively, the one or more database(s) can be connected to controller 166 through any suitable network(s), such as through a high bandwidth local area network (LAN) or wide area network (WAN). In this regard, for example, controller 166 may further include a communication module or interface that may be used to communicate with one or more other component(s) of washing machine appliance 100, controller 166, an external device 182 (e.g., device controller 188), or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Referring again to FIG. 1, a schematic diagram of an external communication system 180 will be described according to an exemplary embodiment of the present subject matter. In general, external communication system 180 is configured for permitting interaction, data transfer, and other communications between washing machine appliance 100 and one or more remote external devices. For example, this communication may be used to provide and receive operating parameters, user instructions or notifications, performance characteristics, user preferences, or any other suitable information for improved performance of washing machine appliance 100. In addition, it should be appreciated that external communication system 180 may be used to transfer data or other information to improve performance of one or more external devices or appliances or improve user interaction with such devices.

For example, external communication system 180 permits controller 166 of washing machine appliance 100 to communicate with a separate device external to washing machine appliance 100, referred to generally herein as a remote or external device 182. As described in more detail below, these communications may be facilitated using a wired or wireless connection, such as via a network 184. In general, external device 182 may be any suitable device separate from washing machine appliance 100 that is configured to provide or receive communications, information, data, or commands from a user. In this regard, external device 182 may be, for example, a personal phone, a smartphone, a tablet, a laptop or personal computer, a wearable device, a smart home system, or another mobile or remote device. In turn, external device 182 may include a monitor or screen 190 configured to display digital two-dimensional images, as would be understood.

In some embodiments, remote user device 182 includes a camera or camera module 178. Camera 178 may be any type of device suitable for capturing a two-dimensional picture or image. As an example, camera 178 may be a video camera or a digital camera with an electronic image sensor [e.g., a charge coupled device (CCD) or a CMOS sensor]. When assembled, camera 178 is generally mounted or fixed to a body of remote user device 182 and is in communication (e.g., electric or wireless communication) with a controller 188 of the remote user device 182 such that the controller may receive a signal from camera 178 corresponding to the image captured by camera 178.

Generally, external device 182 may include a controller 188 (e.g., including one or more suitable processing devices, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. Controller 188 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor of controller 188 or may be included onboard within such processor. In addition, these memory devices can store information or data accessible by the one or more processors of the controller 188, including instructions that can be executed by the one or more processors. It should be appreciated that the instructions can be software written in any suitable programming language or can be implemented in hardware. Additionally, or alternatively, the instructions can be executed logically or virtually using separate threads on one or more processors.

For example, controller 188 may be operable to execute programming instructions or micro-control code associated with operation of or engagement with washing machine appliance 100. In this regard, the instructions may be software or any set of instructions that when executed by the processing device, cause the processing device to perform operations, such as running one or more software applications, displaying or directing a user interface, receiving user input, processing user input, etc. Moreover, it should be noted that controller 188 as disclosed herein is capable of and may be operable to perform one or more methods, method steps, or portions of methods of appliance operation. For example, in some embodiments, these methods may be embodied in programming instructions stored in the memory and executed by controller 188.

The memory devices of controller 188 may also store data that can be retrieved, manipulated, created, or stored by the one or more processors or portions of controller 166. The data can include, for instance, data to facilitate performance of methods described herein. store data that can be retrieved, manipulated, created, or stored by the one or more processors or portions of controller 188. The data can include, for instance, data to facilitate performance of methods described herein. As an example, and turning briefly to FIGS. 3A, 3B, 3C, and 3D, the data may include identifying information to identify or detect a fiducial reference 210 on a front portion of the washing machine appliance 100 (e.g., using camera 178). In some such embodiments, controller 188 may be configured to direct a presentation or display of a real-time feed from the camera 178 (e.g., on monitor 190). Optionally, a two-dimensional reference shape 212 for alignment of the fiducial reference 210 may be displayed. Moreover, movement guidance 214 (e.g., in the form of pictorial or textual instructions, such as arrows or written messages) may be displayed such that a user can properly align the camera 178 to capture an image that may be further analyzed (e.g., to estimate one or more load attributes of a load of clothes 172 within the wash chamber 126).

Returning generally to FIG. 1, the data of controller 188 can be stored locally (e.g., on controller 188) in one or more databases or may be split up so that the data is stored in multiple locations. In addition, or alternatively, the one or more database(s) can be connected to controller 188 through any suitable network(s), such as through a high bandwidth local area network (LAN) or wide area network (WAN). In this regard, for example, controller 188 may further include a communication module or interface that may be used to communicate with washing machine appliance 100, controller 166, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Separate from or in addition to external device 182, a remote server 186 may be in communication with washing machine appliance 100 or external device 182 through network 184. In this regard, for example, remote server 186 may be a cloud-based server 186, and is thus located at a distant location, such as in a separate state, country, etc. According to an exemplary embodiment, external device 182 may communicate with a remote server 186 over network 184, such as the Internet, to transmit/receive data or information, provide user inputs, receive user notifications or instructions, interact with or control washing machine appliance 100, etc. In addition, external device 182 and remote server 186 may communicate with washing machine appliance 100 to communicate similar information.

In general, communication between washing machine appliance 100, external device 182, remote server 186, or other user devices or appliances may be carried using any type of wired or wireless connection and using any suitable type of communication network, non-limiting examples of which are provided below. For example, external device 182 may be in direct or indirect communication with washing machine appliance 100 through any suitable wired or wireless communication connections or interfaces, such as network 184. For example, network 184 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), or protection schemes (e.g., VPN, secure HTTP, SSL).

External communication system 180 is described herein according to an exemplary embodiment of the present subject matter. However, it should be appreciated that the exemplary functions and configurations of external communication system 180 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Now that the construction of washing machine appliance 100 and the configuration of controller 188 according to exemplary embodiments have been presented, exemplary methods (e.g., methods 400 and 500) of operating a washing machine appliance will be described. Although the discussion below refers to the exemplary methods 400 and 500 of operating washing machine appliance 100, one skilled in the art will appreciate that the exemplary methods 400 and 500 are applicable to the operation of a variety of other washing machine appliances, such as vertical axis washing machine appliances. In exemplary embodiments, the various method steps as disclosed herein may be performed (e.g., in whole or part) by controller 188, controller 166, or another, separate, dedicated controller.

Figure 4:
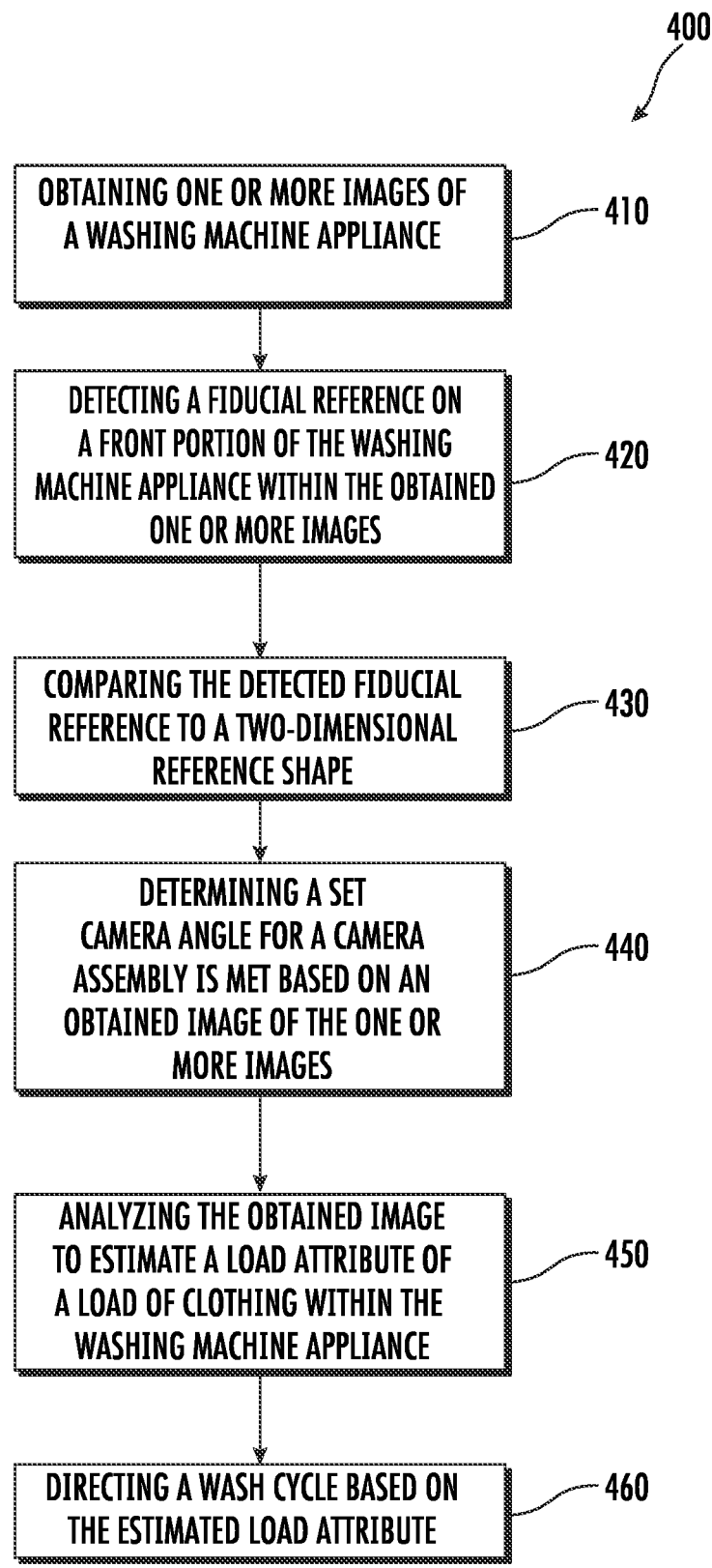
FIG. 4 provides a flow chart illustrating a method of operating a washing machine appliance according to exemplary embodiments of the present disclosure.
Figure 5:
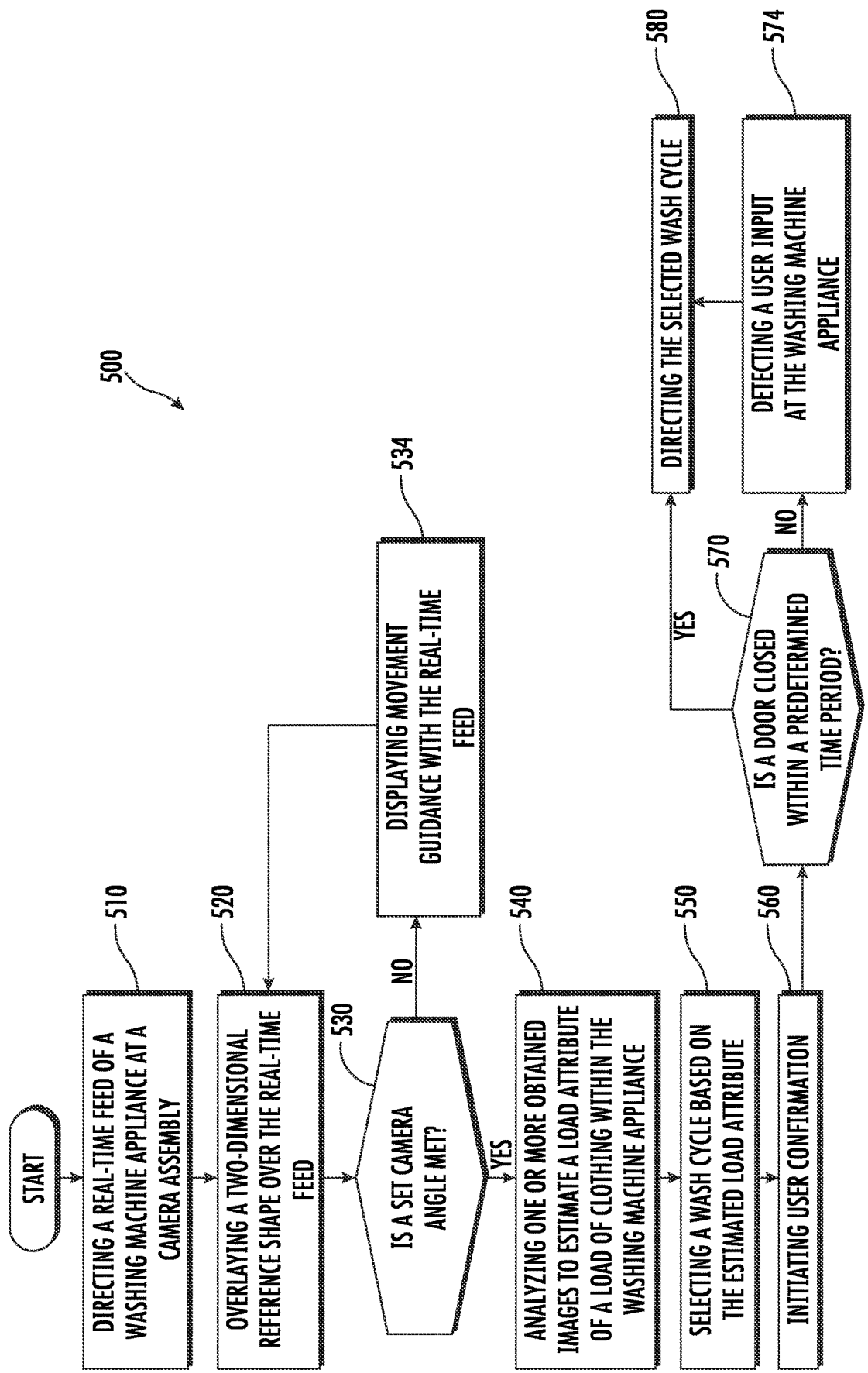
FIG. 5 provides a flow chart illustrating a method of operating a washing machine appliance according to exemplary embodiments of the present disclosure.

FIGS. 4 and 5 depict steps performed in a particular order for purpose of illustration and discussion. Those of ordinary skill in the art, using the disclosures provided herein, will understand that (except as otherwise indicated) methods 400 and 500 are not mutually exclusive. Moreover, the steps of the methods 400 and 500 can be modified, adapted, rearranged, omitted, interchanged, or expanded in various ways without deviating from the scope of the present disclosure.

Advantageously, methods in accordance with the present disclosure may permit one or more attributes of a load of clothes to be automatically and accurately determined. Additionally or alternatively, a user may be advantageously guided to ensure consistent and accurate images are gathered to, in turn, ensure accuracy of any further determinations.

Referring now to FIG. 4, at 410, the method 400 includes obtaining one or more images of the washing machine appliance from a camera assembly or module of a remote device (i.e., external device). In particular, the camera of the external device may be aimed at the washing machine appliance. Along with the cabinet or basket of the washing machine appliance, such images may include a load of clothes that are to be washed during a wash cycle of a washing machine appliance. In this regard, continuing the example from above, load of clothes may be placed within wash chamber of the washing machine appliance prior to closing the door and implementing a wash cycle.

It should be appreciated that obtaining the images may include obtaining more than one image, a series of frames, a video, or any other suitable visual representation of the load of clothes using the camera assembly. Thus, 410 may include receiving a video signal from the camera assembly. Separate from or in addition to the video signal, the images obtained by the camera assembly may vary in number, frequency, angle, resolution, detail, etc. in order to improve the clarity of the load of clothes. In addition, the obtained images may also be cropped in any suitable manner for improved focus on desired portions of the load of clothes.

In optional embodiments, the obtained images can be presented or displayed as a real-time feed of the camera assembly at the remote device (e.g., according to the received video signal). For instant, a constant or regularly refreshing set of live images from the camera assembly may be presented on the monitor or screen of the remote device. Thus, a user viewing the remote device may be able to see the field of view being captured by the camera assembly (e.g., without having to repeatedly freeze the frame or provide any active input by a user on the remote device).

The one or more images may be obtained using the camera assembly at any suitable time prior to initiating the wash cycle. For example, as best illustrated in FIGS. 3A through 3D, these images may be obtained when the door is in the open position (e.g., such that the field of view of the camera can capture at least a portion of the wash chamber through the front opening).

At 420, the method 400 includes detecting a fiducial reference on a front portion of the washing machine appliance within the one or more images. For instance, from the obtained images, the controller may identify the region corresponding to a predetermined portion of the washing machine appliance, which serves as the fiducial reference. Any suitable portion at the front of the washing machine appliance may serve as the fiducial marker. In some embodiments, the fiducial reference is the front opening (e.g., as defined by the cabinet, wash basket, or a gasket extending between the two) permitting access to the wash chamber (e.g., as indicated in FIGS. 3A through 3D).

As is understood, recognizing or identifying such fiducial references or portions of the appliance, may be performed by one or more image processing techniques or algorithms (e.g., executed at the controller of the remote device, remote server, or appliance). According to exemplary embodiments, image processing may include blur detection algorithms that are generally intended to compute, measure, or otherwise determine the amount of blur in an image. For example, these blur detection algorithms may rely on focus measure operators, the Fast Fourier Transform along with examination of the frequency distributions, determining the variance of a Laplacian operator, or any other methods of blur detection known by those having ordinary skill in the art. In addition, or alternatively, the image processing algorithms may use other suitable techniques for recognizing or identifying items or objects, such as edge matching or detection, divide-and-conquer searching, greyscale matching, histograms of receptive field responses, or another suitable routine (e.g., executed at the controller of the remote device, remote server, or appliance based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In certain embodiments, detection of the fiducial reference may permit or prompt determination that the door of the washing machine appliance is open. Thus, the method 400 may include determining the door is open based on one or more of the obtained images. Additionally or alternatively, determining the door is open may be based on a separate signal (e.g., received from the latch assembly) physically detecting a position of the door.

At 430, the method 400 includes comparing the detected fiducial reference to a two-dimensional reference shape in an obtained image of the one or more images. As would be understood, the two-dimensional geometry of a fiducial reference captured in an obtained image will vary depending on the angle of the camera when the image is obtained. The two-dimensional reference shape may correspond to the geometry of the fiducial reference in a set or predetermined camera angle (e.g., in which images to accurately analyze the load within the wash chamber may be obtained). As an example, the two-dimensional reference shape may be a circle, such as may correspond to an intended geometry of the opening in a set angle of the camera. From the comparison, it may be determined if the fiducial reference matches the two-dimensional reference shape (e.g., the fiducial reference within the obtained image has dimensions that are within a set tolerance or range of the two-dimensional reference shape, such as 10%). For instance, the size or eccentricity of the fiducial reference within the obtained image may be calculated and compared to the size or eccentricity programmed for the two-dimensional reference shape.

In certain embodiments, the two-dimensional reference shape may be overlaid on the real-time feed (e.g., presented on the remote device). Thus, as would be understood, a representation of the two-dimensional reference shape may be overlaid onto the real-time feed of the camera and appears as a fixed object in front of the digital representation (i.e., video) of the washing machine appliance on the monitor of the remote device. The position of the two-dimensional reference shape that is displayed or overlaid may be constant, even as the camera angle and obtained images change. Thus, a user may be guided to move the camera such that the fiducial reference aligns to (e.g., behind) the overlaid two-dimensional reference shape. Separate from or in addition to the two-dimensional reference shape, the method 400 may provide for displaying movement guidance (e.g., in the form of pictorial or textual instructions, such as arrows or written messages) with the real-time feed (e.g., to help a user move the camera to align the two-dimensional reference shape with the fiducial reference).

At 440, the method 400 includes determining a set camera angle for the camera assembly is met (e.g., based on 430). For instance, it may be determined that, within an obtained image, the fiducial reference matches or is aligned with the two-dimensional reference shape. Specifically, it may be determined that the fiducial reference in the obtained image has dimensions that correspond in size, curve, or location (e.g., within a set tolerance or range, such as 10%) to the dimensions of the two-dimensional reference shape.

In optional embodiments, a feedback signal is generated (e.g., at the remote device) in response to 440. Such a feedback signal may prompt a feedback action (e.g., visual alert on the monitor, haptic movement at the remote appliance, audio tone, etc.) corresponding to the set camera angle being met such that a user can know further movement of the camera is unnecessary.

At 450, the method 400 includes analyzing the obtained image using a machine learning image recognition process to estimate a load attribute of a load of clothes within the washing machine appliance based on the analysis. As used herein, the term "load attribute" and the like is intended to refer to any qualitative or quantitative characteristic of clothes within the wash chamber. For example, the load attribute may refer to a fabric type, a load color (such as white, light, dark, or mixed), or a load size (e.g., volume, mass, weight, etc.). In addition, it should be appreciated that the load attribute may be an approximation or best fit representation of a load of clothes. For example, a controller may be programmed with thresholds for determining whether a load qualifies as a white load, such as greater than 70% whites, greater than 80% whites, greater than 90% whites, greater than 95% whites, etc.).

In addition to providing approximations regarding primary load attributes such as type of fabric, color, and size, 450 may further include extracting information regarding outliers relative to the average load attribute. For example, if a load is detected as being primarily white or light colors, an outlier may be a single dark garment within the load (e.g., such as a red sock within a load of whites). In addition, 450 may include extracting or identifying unwashable items, such as a belt, a wallet, or another item which was likely inadvertently added into the wash chamber. In sum, 450 may be used for determining any suitable load attribute or other feature of a load of clothes that may be useful in adjusting the operation of washing machine appliance to achieve a better outcome, such as improved efficiency, improved wash performance, etc.

As used herein, the terms image recognition, object detection, and similar terms may be used generally to refer to any suitable method of observation, analysis, image decomposition, feature extraction, image classification, etc. of one or more image or videos taken within a wash chamber of a washing machine appliance. It should be appreciated that any suitable image recognition software or process may be used to analyze images taken by the camera assembly and a controller may be programmed to perform such processes and take corrective action.

In certain embodiments, the image analysis may include utilizing artificial intelligence ("AI"), such as a machine learning image recognition process, a neural network classification module, any other suitable artificial intelligence (AI) technique, or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, controller may implement a form of image recognition called region based convolutional neural network ("R-CNN") image recognition. Generally speaking, R-CNN may include taking an input image and extracting region proposals that include a potential object, such as an item of clothing (e.g., jeans, socks, etc.) or an undesirable article (e.g., a belt, a wallet, etc.). In this regard, a "region proposal" may be regions in an image that could belong to a particular object. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like. It should be appreciated that any other suitable image recognition process may be used while remaining within the scope of the present subject matter.

According to still other embodiments, the image recognition process may use any other suitable neural network process. For example, 450 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image and estimate load size or main load fabric type of the load within the wash basket. In addition, a K-means algorithm may be used for dominant color analysis to find individual color of fabrics to serve with warnings.

According to exemplary embodiments the image recognition process may further include the implementation of Vision Transformer (ViT) techniques or models. In this regard, ViT is generally intended to refer to the use of a vision model based on the Transformer architecture originally designed and commonly used for natural language processing or other text-based tasks. For example, ViT represents an input image as a sequence of image patches and directly predicts class labels for the image. This process may be similar to the sequence of word embeddings used when applying the Transformer architecture to text. The ViT model and other image recognition models described herein may be trained using any suitable source of image data in any suitable quantity. Notably, ViT techniques have been demonstrated to outperform many state-of-the-art neural network or artificial intelligence image recognition processes.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models. According to exemplary embodiments, it should be appreciated that the machine learning models may include supervised or unsupervised models and methods. In this regard, for example, supervised machine learning methods (e.g., such as targeted machine learning) may help identify problems, anomalies, or other occurrences which have been identified and trained into the model. By contrast, unsupervised machine learning methods may be used to detect clusters of potential failures, similarities among data, event patterns, abnormal concentrations of a phenomenon, etc.

It should be appreciated that image processing and machine learning image recognition processes may be used together to facilitate improved image analysis, object detection, color detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

At 460, the method 400 includes directing a wash cycle within the washing machine appliance based on the estimated load attribute (e.g., from 450). Such direction may require adjusting one or more operating parameters of the washing machine appliance (e.g., as part of the wash cycle, which may then be initiated). Thus, 460 may include selecting an operating cycle parameter, adjusting a water or detergent fill amount, or providing a user notification. As used herein, an "operating parameter" of the washing machine appliance is any cycle setting, operating time, component setting, spin speed, part configuration, or other operating characteristic that may affect the performance of the washing machine appliance. In turn, references to operating parameter adjustments or "adjusting at least one operating parameter" are intended to refer to control actions intended to improve system performance based on the load characteristics. For example, adjusting an operating parameter may include adjusting an agitation time or an agitation profile, adjusting a water level, limiting a spin speed of the wash basket, etc. Other operating parameter adjustments are possible and within the scope of the present subject matter.

For example, according to an exemplary embodiment, the mask R-CNN image recognition process may be used on one or more images obtained at 410 to determine that the load of clothes is primarily delicate garments. As a result, it may further be determined that cool water should be used (e.g., below a certain temperature), that the agitation profile should be gentle, and that the total wash time should be decreased. One or more of the corresponding controllers may automatically detect and implement such a wash cycle without requiring user input. By contrast, if a load of sheets or towels is detected, a large volume of hot water may be used with more detergent and an aggressive agitation profile. It should be appreciated that the exemplary load characteristics and the exemplary operating parameters described herein are only exemplary and not intended to limit the scope of the present subject matter in any manner.

In addition, adjusting the at least one operating parameter may include providing a user notification when a predetermined load attribute exists. For example, if 450 results in the detection of an unwashable item, the wash cycle may be restricted (e.g., stopped or otherwise prevented) and a user notification may be provided, e.g., via an indicator on the remote device or the control panel of the appliance. Thus, for example, if a user inadvertently leaves their belt in a pair of pants thrown into the wash chamber, images obtained by the camera assembly may be used to detect the belt and instruct the user to remove the belt before the wash cycle commences. Similarly, if 450 detects a single light item in a load of dark clothes or a single dark item in a load of light clothes, a user may be notified of such condition or the wash cycle may be adjusted to reduce the temperature of water added during a wash cycle to reduce the likelihood of bleeding between the different color articles. According to another exemplary embodiment, the unwashable item may be a child, a pet, or any other item that is not intended for washing or drying. It should be appreciated that the items identified herein as "unwashable" are only exemplary and are not intended to limit the scope of the present subject matter.

In some embodiments, the start of the wash cycle at 460 may be contingent on one or more predetermined conditions. As an example, it may be required that a door shuts within a predetermined time period (e.g., less than one minute, such as a period less than or equal to 30 seconds, 15 seconds, or 5 seconds) following 410 or 440 (e.g., measured in response to 410 or 440). For instance, the method 400 may include determining the door of the washing machine appliance is closed within the predetermined time period (e.g., following 410). Such as determination may be based on a signal from the latch assembly or a subsequently received image from the camera assembly. In turn, 460 may be in response to determining the door is closed within the predetermined time period. If the door is not determined to close within the predetermined time period (e.g., determination of the door being closed within the predetermined time period fails), a user may be required to manually input a start signal (e.g., by pressing a button) at the control panel of the washing machine appliance in order to prompt 460.

Turning now to FIG. 5, at 510, the method 500 includes directing a real-time video feed of a washing machine appliance (e.g., a front portion or wash chamber of the same) at a camera assembly of a remote device. Thus, 510 includes obtaining more than one image, a series of frames, a video, or any other suitable visual representation of the washing machine appliance (and clothes therein) from the camera assembly or module of a remote device (i.e., external device), such as described above. In turn, 510 may include receiving a video signal from the camera assembly. Separate from or in addition to the video signal, the images obtained by the camera assembly may vary in number, frequency, angle, resolution, detail, etc. in order to improve the clarity of the load of clothes. In addition, the obtained images may also be cropped in any suitable manner for improved focus on desired portions of the load of clothes.

The obtained images are then presented or displayed as a real-time feed of the camera assembly at the remote device (e.g., according to the received video signal). For instant, a constant or regularly refreshing set of live images from the camera assembly may be presented on the monitor or display of the remote device. Thus, a user viewing the remote device may be able to see the field of view being captured by the camera assembly (e.g., without having to repeatedly freeze the frame or provide any active input by user on the remote device).

The images may be obtained using the camera assembly at any suitable time prior to initiating the wash cycle. For example, as best illustrated in FIGS. 3A through 3D, these images may be obtained when the door is in the open position (e.g., such that the field of view of the camera can capture at least a portion of the wash chamber through the front opening).

In some embodiments, 510 includes detecting a fiducial reference on a front portion of the washing machine appliance within the images of the real-time video feed. For instance, from the obtained images, the controller may identify the region corresponding to a predetermined portion of the washing machine appliance, which serves as the fiducial reference. Any suitable portion at the front of the washing machine appliance may serve as the fiducial marker. In some embodiments, the fiducial reference is the front opening (e.g., as defined by the cabinet, wash basket, or a gasket extending between the two) permitting access to the wash chamber (e.g., as indicated in FIGS. 3A through 3D).

As is understood, recognizing or identifying such fiducial references or portions of the appliance, may be performed by one or more image processing techniques or algorithms (e.g., executed at the controller of the remote device, remote server, or appliance). According to exemplary embodiments, image processing may include blur detection algorithms that are generally intended to compute, measure, or otherwise determine the amount of blur in an image. For example, these blur detection algorithms may rely on focus measure operators, the Fast Fourier Transform along with examination of the frequency distributions, determining the variance of a Laplacian operator, or any other methods of blur detection known by those having ordinary skill in the art. In addition, or alternatively, the image processing algorithms may use other suitable techniques for recognizing or identifying items or objects, such as edge matching or detection, divide-and-conquer searching, greyscale matching, histograms of receptive field responses, or another suitable routine (e.g., executed at the controller of the remote device, remote server, or appliance based on one or more captured images from one or more cameras). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

At 520, the method 500 includes overlaying a two-dimensional reference shape over the real-time video feed. The two-dimensional reference shape may generally correspond to the geometry of a portion of the washing machine appliance to which the camera assembly or field of view is intended to be aligned (e.g., the fiducial reference). As an example, the two-dimensional reference shape may be a circle, such as may correspond to an intended geometry of the opening in a set angle of the camera.

Generally, a representation of the two-dimensional reference shape is overlaid onto the real-time feed of the camera and appears as a fixed object in front of the digital representation (i.e., video) of the washing machine appliance on the monitor of the remote device. The position of the two-dimensional reference shape that is displayed or overlaid may be constant, even as the camera angle and obtained images change. Thus, a user may be guided to move the camera such that the fiducial reference aligns to (e.g., behind) the overlaid two-dimensional reference shape.

At 530, the method 500 includes determining compliance with a set camera angle for the camera assembly of the remote device. In particular, it may be determined if the set camera angle is met. For instance, the detected fiducial reference may be compared to the two-dimensional reference shape. From the comparison, it may be determined if the fiducial reference matches the two-dimensional reference shape (e.g., the fiducial reference within the obtained image has dimensions that are within a set tolerance or range of the two-dimensional reference shape, such as 10%). For instance, the size or eccentricity of the fiducial reference within the obtained image may be calculated and compared to the size or eccentricity programmed for the two-dimensional reference shape. If the fiducial reference matches the two-dimensional reference shape, the method 500 may proceed to 540. By contrast, if the fiducial reference fails to match the two-dimensional reference shape, the method 500 may proceed to 534 (e.g., before returning to 520).

At 534, the method 500 includes displaying movement guidance (e.g., in the form of pictorial or textual instructions, such as arrows or written messages) with the real-time feed (e.g., to help a user move the camera to align the two-dimensional reference shape with the fiducial reference).

At 540, the method 500 includes analyzing the obtained image using a machine learning image recognition process to estimate a load attribute of a load of clothes within the washing machine appliance based on the analysis. As used herein, the term "load attribute" and the like is intended to refer to any qualitative or quantitative characteristic of clothes within the wash chamber. For example, the load attribute may refer to a fabric type, a load color (such as white, light, dark, or mixed), or a load size (e.g., volume, mass, weight, etc.). In addition, it should be appreciated that the load attribute may be an approximation or best fit representation of a load of clothes. For example, a controller may be programmed with thresholds for determining whether a load qualifies as a white load, such as greater than 70% whites, greater than 80% whites, greater than 90% whites, greater than 95% whites, etc.).

In addition to providing approximations regarding primary load attributes such as type of fabric, color, and size, 540 may further include extracting information regarding outliers relative to the average load attribute. For example, if a load is detected as being primarily white or light colors, an outlier may be a single dark garment within the load (e.g., such as a red sock within a load of whites). In addition, 540 may include extracting or identifying unwashable items, such as a belt, a wallet, or another item which was likely inadvertently added into the wash chamber. In sum, 540 may be used for determining any suitable load attribute or other feature of a load of clothes that may be useful in adjusting the operation of washing machine appliance to achieve a better outcome, such as improved efficiency, improved wash performance, etc.

As used herein, the terms image recognition, object detection, and similar terms may be used generally to refer to any suitable method of observation, analysis, image decomposition, feature extraction, image classification, etc. of one or more image or videos taken within a wash chamber of a washing machine appliance. It should be appreciated that any suitable image recognition software or process may be used to analyze images taken by the camera assembly and a controller may be programmed to perform such processes and take corrective action.

In certain embodiments, the image analysis may include utilizing artificial intelligence ("AI"), such as a machine learning image recognition process, a neural network classification module, any other suitable artificial intelligence (AI) technique, or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, controller may implement a form of image recognition called region based convolutional neural network ("R-CNN") image recognition. Generally speaking, R-CNN may include taking an input image and extracting region proposals that include a potential object, such as an item of clothing (e.g., jeans, socks, etc.) or an undesirable article (e.g., a belt, a wallet, etc.). In this regard, a "region proposal" may be regions in an image that could belong to a particular object. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like. It should be appreciated that any other suitable image recognition process may be used while remaining within the scope of the present subject matter.

According to still other embodiments, the image recognition process may use any other suitable neural network process. For example, 540 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image and estimate load size or main load fabric type of the load within the wash basket. In addition, a K-means algorithm may be used for dominant color analysis to find individual color of fabrics to serve with warnings.

According to exemplary embodiments the image recognition process may further include the implementation of Vision Transformer (ViT) techniques or models. In this regard, ViT is generally intended to refer to the use of a vision model based on the Transformer architecture originally designed and commonly used for natural language processing or other text-based tasks. For example, ViT represents an input image as a sequence of image patches and directly predicts class labels for the image. This process may be similar to the sequence of word embeddings used when applying the Transformer architecture to text. The ViT model and other image recognition models described herein may be trained using any suitable source of image data in any suitable quantity. Notably, ViT techniques have been demonstrated to outperform many state-of-the-art neural network or artificial intelligence image recognition processes.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models. According to exemplary embodiments, it should be appreciated that the machine learning models may include supervised or unsupervised models and methods. In this regard, for example, supervised machine learning methods (e.g., such as targeted machine learning) may help identify problems, anomalies, or other occurrences which have been identified and trained into the model. By contrast, unsupervised machine learning methods may be used to detect clusters of potential failures, similarities among data, event patterns, abnormal concentrations of a phenomenon, etc.

It should be appreciated that image processing and machine learning image recognition processes may be used together to facilitate improved image analysis, object detection, color detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

At 550, the method 500 includes selecting a wash cycle based on the estimated load attribute. The wash cycle includes settings that may be contingent, for instance, on the estimated load attribute (or attributes). Thus, 550 may include selecting an operating cycle parameter, adjusting a water or detergent fill amount, or providing a user notification. As used herein, an "operating parameter" of the washing machine appliance is any cycle setting, operating time, component setting, spin speed, part configuration, or other operating characteristic that may affect the performance of the washing machine appliance. In turn, references to operating parameter adjustments or "adjusting at least one operating parameter" are intended to refer to control actions intended to improve system performance based on the load characteristics. For example, adjusting an operating parameter may include adjusting an agitation time or an agitation profile, adjusting a water level, limiting a spin speed of the wash basket, etc. Other operating parameter adjustments are possible and within the scope of the present subject matter.

At 560, the method 500 includes initiating a user confirmation (e.g., at the remote device). The user confirmation may include a visual alert on the monitor, haptic movement at the remote appliance, audio tone, etc. Moreover, the user confirmation may be prompted by or in response to one of the previous steps (e.g., 530, 540, or 550). In optional embodiments, a feedback signal is generated (e.g., at the remote device) in response to the match being determined. Such a feedback signal may prompt the user confirmation such that a user can know further movement of the camera is unnecessary.

At 570, it may be determined if the door to the washing machine appliance being closed within a predetermined time period (e.g., less than one minute, such as a period less than or equal to 30 seconds, 15 seconds, or 5 seconds) following one or more of the previous steps (e.g., 510, 530, 540, 550, or 560). Such as determination may be based on a signal from the latch assembly or a subsequently received image from the camera assembly. If the door is shut within the predetermined time period, the method 500 may proceed to 580. By contrast, if the door fails to shut (i.e., be closed) within the predetermined time period, the method 500 may proceed to 574 (e.g., before proceeding to 580).

At 574, the method includes detecting a user input at the washing machine appliance. Such a detection may be made, for instance, in response a user pressing a button or other suitable input feature on the control panel of the washing machine appliance.

At 580, the method includes directing the selected wash cycle. Specifically, the washing machine appliance may start and further execute the selected wash cycle, as would be understood in light of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a washing machine appliance, the washing machine appliance comprising a cabinet, a wash tub, and a wash basket, the wash tub being mounted within the cabinet, and the wash basket being rotatably mounted within a wash tub and defining a wash chamber configured for receiving a load of clothes, the method comprising:
   obtaining one or more images of the washing machine appliance from a camera assembly of a remote device spaced apart from the cabinet;
   detecting a fiducial reference on a front portion of the washing machine appliance within the one or more images;
   comparing the detected fiducial reference to a two-dimensional reference shape in an obtained image of the one or more images;
   determining a set camera angle for the camera assembly is met based on the comparison in the obtained image;
   analyzing the obtained image using a machine learning image recognition process to estimate a load attribute of a load of clothes within the washing machine appliance based on the analysis,
   the load attribute comprising at least one of a fabric type, a load color, or a load size; and
   directing a wash cycle such that the wash cycle is performed within the washing machine appliance based on the estimated load attribute.

2. The method of claim 1, wherein the washing machine appliance defines an opening to the wash chamber to permit access thereto, and wherein the fiducial reference is the opening.

3. The method of claim 1, wherein the two-dimensional reference shape is a circle.

4. The method of claim 1, further comprising:
   determining a door of the washing machine appliance is open prior to determining the set camera angle is met.

5. The method of claim 1, further comprising:
   determining a door of the washing machine appliance is closed within a predetermined time period following obtaining one or more images of the washing machine appliance,
   wherein directing the wash cycle is in response to determining the door is closed within the predetermined time period.

6. The method of claim 1, further comprising:
   generating a feedback signal prompting a feedback action at the remote device in response to determining the set camera angle is met.

7. The method of claim 1, wherein obtaining one or more images comprises receiving a video signal from the camera assembly, and wherein the method further comprises
   presenting a real-time feed of the camera assembly at the remote device according to the received video signal; and
   overlaying the two-dimensional reference shape over the real-time feed.

8. The method of claim 1, wherein obtaining one or more images comprises receiving a video signal from the camera assembly, and wherein the method further comprises
   presenting a real-time feed of the camera assembly at the remote device according to the received video signal; and
   displaying movement guidance with the real-time feed to align the two-dimensional reference shape with the fiducial reference.

9. The method of claim 1, wherein the machine learning image recognition process comprises at least one of a convolution neural network ("CNN"), a region-based convolution neural network ("R-CNN"), a deep belief network ("DBN"), a deep neural network ("DNN"), or a vision transformer ("ViT") image recognition process.

10. A method of operating a washing machine appliance, the washing machine appliance comprising a cabinet, a wash tub, and a wash basket, the wash tub being mounted within the cabinet, and the wash basket being rotatably mounted within a wash tub and defining a wash chamber configured for receiving a load of clothes, the method comprising:
    obtaining one or more images of the washing machine appliance from a camera assembly of a remote device spaced apart from the cabinet, obtaining one or more images comprising receiving a video signal from the camera assembly;
    presenting a real-time feed of the camera assembly at the remote device according to the received video signal;
    detecting a fiducial reference on a front portion of the washing machine appliance within the one or more images;
    comparing the detected fiducial reference to a two-dimensional reference shape in an obtained image of the one or more images;
    overlaying the two-dimensional reference shape over the real-time feed;
    determining a set camera angle for the camera assembly is met based on the comparison in the obtained image;

analyzing the obtained image using a machine learning image recognition process to estimate a load attribute of a load of clothes within the washing machine appliance based on the analysis, the load attribute comprising at least one of a fabric type, a load color, or a load size; and directing a wash cycle such that the wash cycle is performed within the washing machine appliance based on the estimated load attribute.

11. The method of claim 10, wherein the washing machine appliance defines an opening to the wash chamber to permit access thereto, and wherein the fiducial reference is the opening.

12. The method of claim 10, wherein the two-dimensional reference shape is a circle.

13. The method of claim 10, further comprising:

determining a door of the washing machine appliance is open prior to determining the set camera angle is met.

14. The method of claim 10, further comprising:

determining a door of the washing machine appliance is closed within a predetermined time period following obtaining one or more images of the washing machine appliance, wherein directing the wash cycle is in response to determining the door is closed within the predetermined time period.

15. The method of claim 10, further comprising:

generating a feedback signal prompting a feedback action at the remote device in response to determining the set camera angle is met.

16. The method of claim 10, wherein the method further comprises displaying movement guidance with the real-time feed to align the two-dimensional reference shape with the fiducial reference.

17. The method of claim 10, wherein the machine learning image recognition process comprises at least one of a convolution neural network ("CNN"), a region-based convolution neural network ("R-CNN"), a deep belief network ("DBN"), a deep neural network ("DNN"), or a vision transformer ("ViT") image recognition process.

* * * * *